Patented June 8, 1954

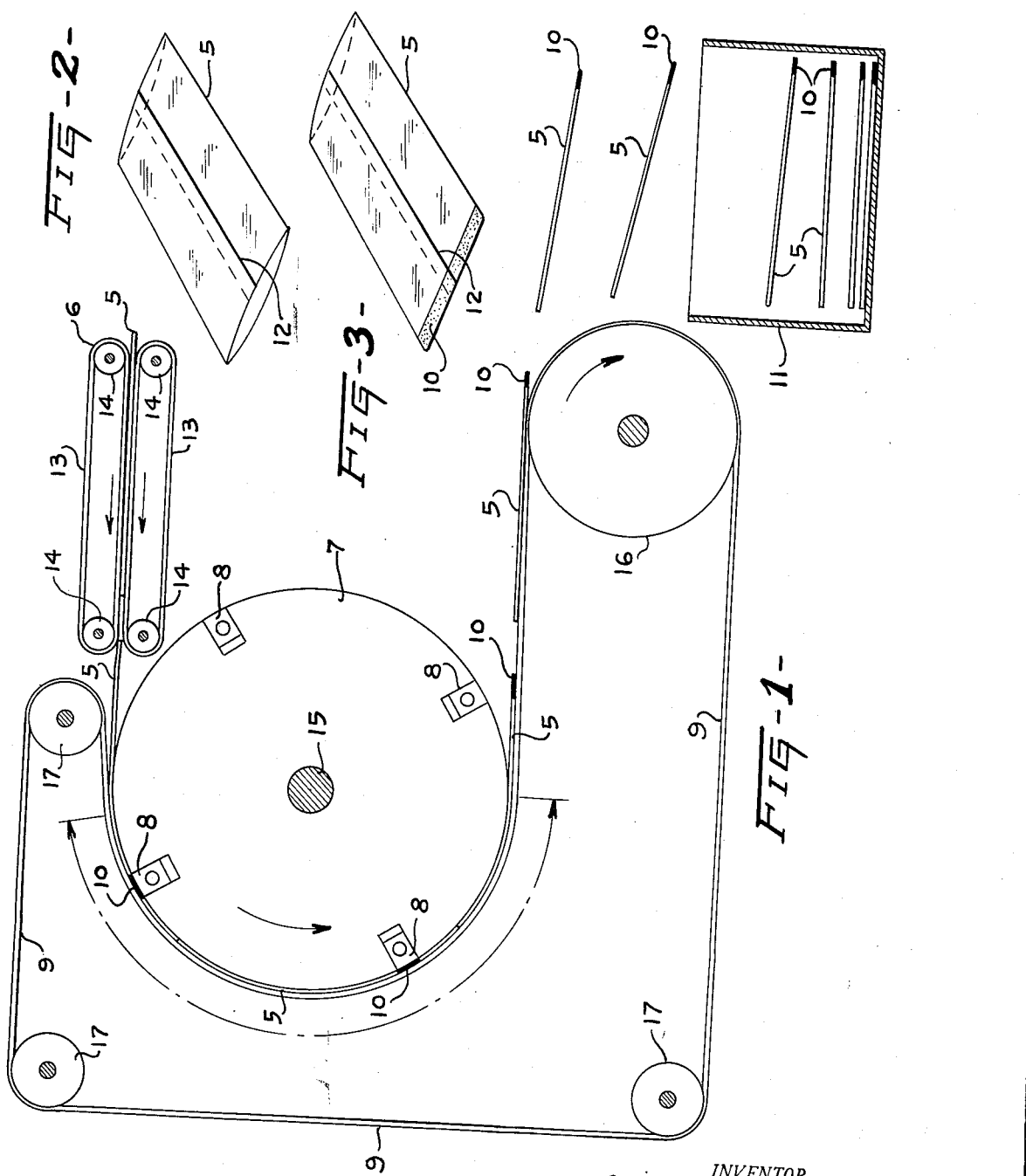

2,680,471

UNITED STATES PATENT OFFICE 2,680,471

HEAT AND PRESSURE SEALING APPARATUS

Lewis P. Mercer, Inglewood, Calif., assignor to Milprint, Inc., Milwaukee, Wis., a corporation of Delaware Original application December 14, 1950, Serial No. 200,735. Divided and this application September 28, 1953, Serial No. 382,762

6 Claims. (Cl. 154—42)

The present invention relates generally to improvements in the art of heat and pressure sealing, and relates more particularly to an improved apparatus for effecting transverse seals in multiple-ply ribbons or tubes of thermo-plastic material or the like.

This application is a division of my copending application Serial No. 200,735, filed December 14, 1950; and the primary object of this invention is to provide an improved simple, compact and highly efficient apparatus for rapidly transversely sealing desired local portions of advancing tubes or superimposed ribbons of heat-sealable sheet material.

It has long been common practice in the packaging field to form commodity bags of thermoplastic sheet materials such as "Pliofilm" adapted to seal upon application of heat and pressure without need for using glue or other separate adhesives. In the manufacture of such bags, it is customary to first form a flat longitudinally seamed or a seamless extruded tube of the material and to thereafter provide transverse seals at predetermined spaced points along the tube which may be severed adjacent to each of such transverse seals either before or after the sealing operation to thereby provide a plurality of bags each having a seamed bottom. While the formation of the longitudinal side seam of the tube poses no particular problem because various types of apparatus may obviously be readily designed which are adapted to permit any desired length of dwell of the heat and pressure sealing means on the overlapping edge portions of the tube as it is advanced continuously, considerable difficulty has in fact been encountered in producing effective transverse or bottom seals, particularly in a continuous manner, due to the inability to provide apparatus wherein the heat and pressure application transversely of the tube is of a sufficient time interval to produce effective sealing as the tube is advanced.

It is therefore a more specific object of the present invention to provide an improved apparatus for effecting transverse seals in advancing tubes or multiple-ply ribbons of thermo-plastic materials by application of heat and pressure which obviates all of the difficulties attendant prior apparatus.

Another specific object of the invention is to provide an improved apparatus for economically and continuously producing highly effective transverse seals in thermo-plastic sheet stock by extremely lengthy application of heat and pressure while the stock is advancing.

Another specific object of my invention is to provide an improved apparatus for effecting transverse seals in continuously advancing flattened tube sections or the like wherein the sealing operation is performed by prolonged application of heat and pressure uniformly applied with the aid of a relatively resilient belt.

Another specific object of this invention is to provide an improved apparatus for commercially producing bags from thermoplastic materials in a most expeditious and economical manner.

Still another specific object of my present invention is to provide an improved heat and pressure sealing apparatus for effecting transverse seals in multiple-ply ribbons of diverse lengths of thermoplastic materials which comprises relatively few simple parts which may be quickly and easily assembled and dismantled, which are all readily accessible and which are moreover subject to minimum wear and therefore capable of long usage.

A further specific object of the present invention is to provide an improved apparatus of effecting transverse seals at predetermined portions of multiple-ply ribbons of thermo-plastic sheet material, which comprises, means for longitudinally advancing the ribbon, means for subjecting a local portion of one side of the advancing ribbon to heat transversely thereacross for a prolonged period of time, and means for simultaneously applying resilient pressure to the other side of the advancing ribbon throughout the heating operation.

An additional specific object of the present invention is to provide improved apparatus for effecting transverse seals at predetermined portions of multiple-ply ribbons of thermoplastic sheet material whereby efficient and durable seals may be produced at a maximum rate and in the presence of minimum temperatures to thereby eliminate the danger of burning or scorching.

These and other specific objects and advantages of the invention will be apparent from the following detailed description.

A clear conception of typical apparatus for effecting commercial exploitation of the invention may be had by referring to the drawing accompanying and forming a part of this specification, wherein like reference characters designate the same or similar parts in the several views.

Fig. 1 is a more-or-less diagrammatic view of a typical apparatus embodying the invention and adapted for effecting the production of commodity bags.

Fig. 2 is a perspective view of a somewhat distended section of tubing prior to the transverse sealing thereof; and Fig. 3 is a similar perspective view of the tube section after the transverse sealing of one end thereof with the aid of the improved apparatus to form a commodity bag.

While the improved apparatus has been particularly described herein as being especially advantageously applicable in the continuous production of commodity bags formed of thermoplastic sheets folded to tubular formation and having a longitudinal side seam, it is not desired or intended to unnecessarily limit the invention by virtue of such restricted disclosure and application, since the improved apparatus may be utilized to advantage in joining multiple-ply ribbons of diverse heat-sealable materials for other purposes; and it is also contemplated that certain specific descriptive terms used herein be given the broadest possible interpretation consistent with the disclosure.

In the commercial exploitation of the present invention, I prefer to utilize an installation substantially like that shown diagrammatically in the accompanying drawing, especially in the production of commodity bags from sections of flattened tubing. Referring to the drawing, the initial sections of multiple-ply ribbons or flattened tubes 5 of thermoplastic sheet material cut to the desired lengths may be supplied in any suitable manner successively to a feed conveyor 6 from which they are longitudinally fed in timed succession tangentially to an arcuate path formed by suitable means such as the periphery of a drum 7, means such as a transverse heating element or bar 8 carried by the drum 7 and formed for cooperation with the successive sections of the longitudinally advancing ribbons for subjecting predetermined local portions of one side thereof to heat transversely thereacross throughout the travel of each section 5 along the arcuate path formed by the periphery of the drum 7, and means such as a flexible belt or continuous band 9 for simultaneously applying resilient pressure to the other side of the advancing sections in opposition to the heating means throughout the heating operation.

The heating element 8 and belt 9 cooperate to simultaneously apply heat and pressure to one end portion of each of the thermo-plastic or heat-sealable ribbons 5 for a prolonged period of time and throughout the travel thereof along the arcuate path to thereby provide transverse seals 10 entirely across the successive ribbon sections 5 as these sections leave the arcuate path; and the finally sealed ribbon sections may then be advanced tangentially from the drum periphery longitudinally to a stacker 11 as shown in Fig. 1, each of such sections 5 assuming the form of a flattened bag having a transverse bottom seal 10 as shown in Fig. 3 and a previously formed longitudinal side seam 12 if seamed tubing has been used as shown. The feeding device 6 may preferably consist of a pair of cooperable endless belts 13 each driven about a pair of suitable spaced pulleys 14 and between which the sections 5 may be successively longitudinally advanced in a straight line plane leading tangentially to the drum periphery as shown; and for proper operation, the operating speed of the conveyor 6 must be synchronized with that of the heating element or elements 8 so that the transverse seal 10 will be effected at the desired locality of the advancing tube or ribbon sections 5. To facilitate timing and advancement of the heating elements 8 along a given arcuate path, it is preferable to mount the cylindrical drum 7 for rotation about a central axis 15 as shown with the drum being provided with one or more of the heating elements 8 disposed about and extending transversely across the periphery thereof for rotation therewith, each of the heaters being adapted to transversely contact a predetermined portion of one of the advancing ribbon sections 5 and to remain in contact therewith during its entire travel along the arcuate or semi-circular path for approximately the distance of one half of the circumference of the drum. The belt 9, of course, is flexible and is also preferably somewhat resilient, and this belt is preferably driven by suitable means such as a drive roller 16 about pulleys 17 in such a manner as to remain in contact with the one side or external ply of the ribbon 5 throughout the heating operation, thereby effecting simultaneous application of resilient pressure in opposition to each of the heating elements 8 throughout the period of contact of such elements with the ribbon. It is particularly important to note that the pressure applying belt 9 as used herein is of a different length than the circumference of the drum 7 carrying the heating elements 8 so that a different portion of the belt is placed in opposition to each heating element as the next successive seal 10 is effected, thereby subjecting the belt 9 to minimum heat and wear and assuring a more uniform heat application in each operation.

From the foregoing detailed description, it will be apparent that the present invention provides an improved apparatus for commercially effecting transverse seals at predetermined portions of multiple-ply ribbon sections of thermoplastic or heat-sealable sheet material and which is especially extremely simple and highly efficient in the rapid and continuous production of commodity bags or the like. Since the heat and pressure for effecting the successive seals 10 is applied for a prolonged period of time, as illustrated by dot-and-dash lines in Fig. 1, without in any way slowing or disrupting the continuous advancement of the successive ribbon or tubing sections 5, the resultant seals possess maximum durability and strength and they may nevertheless be produced at minimum temperatures and at a maximum rate of speed. Furthermore, the use of the continuous belt 9 insures uniform pressure application throughout the heating or heat sealing process, thereby also enabling production of bags having uniform transverse seals. The heating elements 8 may, of course, assume any desired form such as bars or plates connected in a well known manner to an electrical source for heating the same, and by making the belt of a length which is different than the circumference of the drum 7, minimum wear will result and constantly uniform heat will be applied at each seal because of the fact that a different portion of the belt 9 will be opposed to the heating element 8 during successive heating operations. While four equally spaced heaters 8 have been shown herein, the number of such heaters may obviously be varied as desired without departing from the invention; and if desired, the feed conveyor 6 may also be modified. Through utilization of the improved apparatus, commercial production of bags or like flexible containers may be carried out in a continuous manner under readily controllable conditions with minimum attention, and the apparatus herein described may be operated by a novice and has, in fact, proven highly successful in actual commercial use. The apparatus is furthermore extremely compact, durable and simple in construction, with all parts being readily accessible for inspection, adjustment, replacement and/or repair; and although the speed of the feed conveyor 6 must be synchronized with the speed of the drum 7 to assure application of heat by the elements 8 at the desired localities, ribbons or tubes of varying lengths as well as continuous ribbons or tubes may be effectively operated upon merely by varying the rate at which the sections 5 are fed to the conveyor 6 in an obvious manner. While the heat sealers 8 have been shown and described as operating on the leading ends of the successive sections 5 for effecting the transverse seals, it is apparent that the device would operate with equal effectiveness to seal the trailing ends or any other desired portions thereof, and this is obviously merely a matter of regulation in the feed of the sections 5 to the drum 7.

It should be understood that it is not desired or intended to limit this invention to the exact details of the apparatus herein shown and described, since various modifications within the scope of the appended claims may occur to persons skilled in the art to which this invention pertains.

I claim:

1. Apparatus for effecting transverse seals at predetermined portions of multiple-ply ribbons of thermo-plastic sheet material, comprising, a cylindrical drum, means for longitudinally advancing the ribbons over the arcuate periphery of said drum, a heating element carried by said drum and movable with the ribbons for subjecting local portions of one side thereof to heat transversely thereacross throughout the travel of the ribbons over the drum periphery, and means for simultaneously applying resilient pressure to the other side of the ribbons throughout the heating operation.

2. Apparatus for effecting transverse seals at predetermined portions of multiple-ply ribbons of thermo-plastic sheet material, comprising, a cylindrical drum, means for continuously longitudinally advancing the ribbons over the arcuate periphery of said drum, a heating element carried by said drum and movable with the ribbons for subjecting local portions of one side thereof to heat transversely thereacross throughout the travel of the ribbons over the drum periphery, and a belt movable with the ribbons over the periphery of said drum for simultaneously applying resilient pressure to the other side of the ribbons throughout the heating operation.

3. Apparatus for effecting transverse seals at predetermined portions of multiple-ply ribbons of thermo-plastic sheet material, comprising, a rotatable cylindrical drum, means for continuously longitudinally advancing the ribbons tangentially to the periphery of said drum for movement therewith along an arcuate path, a transverse heating element carried by said drum for rotation therewith for subjecting local portions of one side of the advancing ribbons to heat transversely thereacross throughout the travel thereof along the arcuate path, and a flexible belt cooperable with the other side of the ribbons for simultaneously applying resilient pressure thereto throughout the heating operation.

4. Apparatus for effecting transverse seals at predetermined portions of multiple-ply ribbons of thermo-plastic sheet material, comprising, a rotatable cylindrical drum means for continuously longitudinally advancing the ribbons to the periphery of said drum for movement therewith along an arcuate path, a heating element carried by said drum for rotation therewith for subjecting local portions of one side of the advancing ribbons to heat transversely thereacross throughout the travel thereof along the arcuate path, and a flexible belt cooperable with the other side of the ribbons for simultaneously applying resilient pressure thereto throughout the heating operation, said belt being of a different length than the circumference of said drum.

5. Apparatus for effecting transverse seals at predetermined portions of a multiple ply ribbon of thermoplastic sheet material, comprising, a cylindrical drum, means for longitudinally advancing the ribbon over the arcuate periphery of said drum, a heating element carried by said drum and movable with the ribbon for subjecting a local portion of one side thereof to heat transversely thereacross throughout the travel of the ribbon over the drum periphery, and means for simultaneously applying resilient pressure to the other side of the ribbon throughout the heating operation.

6. Apparatus for effecting transverse seals at predetermined portions of a multiple ply ribbon of thermoplastic sheet material, comprising, a carrier member having a cylindrical surface, means for longitudinally advancing the ribbon in contact with the cylindrical surface of said carrier member, a heating element revolvable with said cylindrical member surface and cooperable with the side of said ribbon facing said member surface for subjecting a local portion of said ribbon side to heat transversely thereacross, and means for simultaneously applying resilient pressure to the other side of the ribbon in opposition to said heating element.

No references cited.